US007665662B2

(12) United States Patent
Faulk

(10) Patent No.: US 7,665,662 B2
(45) Date of Patent: Feb. 23, 2010

(54) METHOD AND SYSTEM FOR ELECTRONIC REPORTING OF INSTITUTIONAL VOTES AFFECTING CORPORATE GOVERNANCE TO A PLAN SPONSOR

(75) Inventor: Anne O. Faulk, Atlanta, GA (US)

(73) Assignee: Inveshare, Inc., Atlanta, GA (US)

( * ) Notice: Subject to any disclaimer, the term of this patent is extended or adjusted under 35 U.S.C. 154(b) by 841 days.

(21) Appl. No.: 11/406,037

(22) Filed: Apr. 18, 2006

(65) Prior Publication Data

US 2006/0231617 A1   Oct. 19, 2006

Related U.S. Application Data

(60) Provisional application No. 60/672,901, filed on Apr. 19, 2005.

(51) Int. Cl.
*G06F 17/60*  (2006.01)
(52) U.S. Cl. .......................... 235/386; 235/486; 705/1; 705/4; 705/35; 705/36; 705/64; 705/65
(58) Field of Classification Search ................. 235/386, 235/486; 705/1, 4, 35, 36, 64, 65
See application file for complete search history.

(56) References Cited

U.S. PATENT DOCUMENTS

| | | | | |
|---|---|---|---|---|
| 5,400,248 | A | * | 3/1995 | Chisholm .................... 705/12 |
| 5,671,358 | A | | 9/1997 | Debe et al. |
| 5,875,432 | A | * | 2/1999 | Sehr ............................ 705/12 |
| 6,081,793 | A | * | 6/2000 | Challener et al. ............. 705/50 |
| 7,222,094 | B2 | * | 5/2007 | Ross ........................ 705/36 R |
| 2004/0117244 | A1 | | 6/2004 | Scott |
| 2005/0061881 | A1 | | 3/2005 | Clancy |
| 2005/0067493 | A1 | | 3/2005 | Urken |
| 2007/0156448 | A1 | * | 7/2007 | Faulk ............................. 705/1 |
| 2007/0198432 | A1 | * | 8/2007 | Pitroda et al. ................. 705/64 |

* cited by examiner

*Primary Examiner*—Allyson N Trail
(74) *Attorney, Agent, or Firm*—Womble Carlyle Sandridge & Rice, PLLC

(57) ABSTRACT

A method, system and program product for the electronic delivery of reports of institutional votes affecting corporate governance to an institutional account holder, also referred to as a plan sponsor. An electronic template is provided to each institutional manager to declare a proxy voting position on each issue that can appear on a corporate proxy ballot. Subsequently, each institutional manager is presented with an electronic proxy ballot for each position in the corporation's stock. Each institutional manager is enabled to vote proxies using an electronic vote reporting platform. A plurality of voting results from the votes of the institutional managers is aggregated by the electronic vote reporting platform. An electronically-generated report for the aggregated voting results is then provided to the institutional account holder. A separate electronically-generated report for the voting results for each institutional manager over a selected period of time can also be provided to the institutional account holder. The electronically-generated reports can include a summary and/or detailed voting records across all managers or for each institutional manager over selected time periods. The user interface associated with the electronic vote reporting platform enables the plan sponsor to customize certain displays of voting results.

22 Claims, 25 Drawing Sheets

| <Plan Sponsor Name> Reports by Company | | | | | |
|---|---|---|---|---|---|
| Company | Class | Meeting Date | Vote Summary | Net Voting Detail | Detail by Manager |
| Abbott Laboratories | | 04/23/04 | view | view | view |
| ABM Industries Incorporated | | 03/09/04 | view | view | view |
| Accenture Ltd. | Class A Common | 02/05/04 | view | view | view |
| Accenture Ltd. | Class X Common | 02/05/04 | view | view | view |
| Actuant Corporation | Class A Common | 1/9/2004 | view | view | view |
| Acuity Brands, Inc. | Common | 12/18/2003 | view | view | view |
| ADVO, Inc. | Common Par Value $.01 | 1/23/2004 | view | view | view |
| Aetna Inc. | Common | 04/30/04 | view | view | view |
| Agilent Technologies, Inc. | Common | 3/2/2004 | view | view | view |
| Air Products & Chemicals, Inc. | Common Par Value $1.00 | 1/22/2004 | view | view | view |
| Alberto-Culver Company | Class B Common | 1/22/2004 | view | view | view |
| Alliance Gaming Corporation | Common | 12/10/03 | view | view | view |
| Allied Domecq PLC | ADR | 1/30/2004 | view | view | view |
| Allied Waste Industries, Inc. | Common | 12/18/2003 | view | view | view |
| Allied Waste Industries, Inc. | Series A Preferred | 12/18/2003 | view | view | view |
| Amdocs Limited | Ordinary | 01/22/03 | view | view | view |
| AOL Time Warner, Inc. | Common | 5/16/2003 | view | view | view |
| AOL Time Warner, Inc. | LMCN-V Common | 5/16/2003 | view | view | view |
| Apache Corporation | Common | 12/18/2003 | view | view | view |
| Apogent Technologies, Inc. | Common | 01/27/04 | view | view | view |
| ARAMARK Corporation | Class A Common | 02/03/04 | view | view | view |
| ARAMARK Corporation | Class B Common | 02/03/04 | view | view | view |
| Arch Chemicals, Inc. | | 04/24/04 | view | view | view |
| ArvinMeritor, Inc. | Common Par Value $1.00 | 02/18/04 | view | view | view |
| ASA Limited | Ordinary | 02/06/04 | view | view | view |
| Ashland Inc. | Common | 01/29/04 | view | view | view |
| Atmos Energy Corporation | Common | 02/11/04 | view | view | view |

| <Plan Sponsor Name> Reports by Manager | | | |
|---|---|---|---|
| Manager Name | Details by Company | Votes Not Cast | Votes Against Policy |
| ABC Bank Asset Manager | view* | view* | view* |
| Alliance Bernstein Institutional Investment Manager | view | view | view* |
| Bank of Ireland Asset Management LTD | view | view | view |
| Brown Capital Management INC. | view | view | view |
| Denali Advisors LLC | view | view | view |
| Dimensional Fund Advisors INC | view* | view* | view* |
| GE Asset Management | view | view | view |
| Goldman Sachs & Co Asset Management | view | view* | view |
| JPMorgan Fleming Asset Management | view | view | view |
| LaSalle Investment Management INC | view | view | view |
| Mercury Asset Management LTD | view | view | view |
| Newport Pacific Management | view | view | view |
| Oak Associates, LTD | view | view | view |
| Oppenhiemer Capital | view* | view* | view* |
| Putnam Investments INC | view | view | view |
| Pzena Investment Management LLC | view | view | view |
| Relational Investors | view | view | view |
| State Street Global Advisors | view | view | view |

* denote the "Live" links

FIG. 5

| <Plan Sponsor Name> Reports by Issue | | |
|---|---|---|
| Issue Category | Management | Shareholder |
| Antitakeover | view | view |
| Banking and Insurance | view | |
| Board issues | view | view |
| Capitalization | view | |
| Charitable Contributions | view | view |
| Compensation | view* | view |
| Directors Compensation | view | view |
| Energy and Environmental | | view* |
| Equal employment opportunity | | view |
| Governance | view | view |
| Health | | view |
| International operations | | view |
| Merger / Restructuring | view | view |
| Political contributions | view | view |
| Routine | view* | view |
| Social issues | view | view |
| Sustainability and ethics | | view |
| Voting | view | view |

FIG. 6

<Plan Sponsor Name> Votes Against Policy Report

Header: For Company = All    (Remove "Meeting Dates" field)

ABC Bank Asset Manager

| Company Name | Class | Meeting Date | Proposal Issue | Policy | Vote | Comments |
|---|---|---|---|---|---|---|
| Qwest Communications International, Inc. | Common | 12/16/2003 | Environment | Abstain | For | If this company quit polluting, they'd stop having to pay major fines. |
| AOL Time Warner, Inc. | Common | 5/16/2003 | Auditors | For | Against | Auditing firm indicted. |
| AOL Time Warner, Inc. | LMCN-V Common | 5/16/2003 | Auditors | For | Against | Auditing firm indicted. |
| IDT Corporation | Class A Common | 12/15/2003 | Adopt Stock Option Plan | For | Against | Plan is not performance based |
| IDT Corporation | Class B Common | 12/15/2003 | Adopt Stock Option Plan | For | Against | Plan is not performance based |
| IDT Corporation | Common | 12/15/2003 | Adopt Stock Option Plan | For | Against | Plan is not performance based |
| Alliance Gaming Corporation | Common | 12/10/03 | Director Compensation | For | Against | Compensation already above standard. |
| Dell | Common | 4/23/2003 | Improve Labor Practices | Abstain | Against | Company faces EEOC fine. |
| Communications Corp. | Multiple | 01/29/04 | Directors | For | Withhold | Same Chairman and CEO |
| Communications Corp. | Subordinate | 01/29/04 | Auditors | For | Against | Company hasn't changed auditors in ten years |
| Amdocs Limited | Ordinary | 01/22/03 | Auditors | For | Against | Excessive non-audit fees |
| The BOC Group PLC | ADR | 01/23/04 | Directors | For | Withhold | Poor corporate performance and excessive compensation |
| The BOC Group PLC | ADR | 01/23/04 | Approve Reincorporation | Against | For | Delaware laws more responsive |
| The BOC Group PLC | ADR | 01/23/04 | Repricing underwater options | Against | For | CEO needs to repay loans for stock purchase. |
| The BOC Group PLC | ADR | 01/23/04 | Platinum Parachute for terminated chairman | Against | For | Chairman is a Board Member of ABC Bank. |
| D.R. Horton, Inc. | Value $.01 | 01/29/04 | Adopt Annual Bonus Plan | For | Against | Plan is excessive |
| Family Dollar Stores, Inc. | Common | 01/15/04 | Employment Opportunity | Abstain | For | Board refuses to provide EEO information |

Alliance Bernstein Institutional Investment Manager

| Company Name | Class | Meeting Date | Proposal Issue | Policy | Vote | Comments |
|---|---|---|---|---|---|---|
| Tyco International, Ltd. | Common | 3/6/2003 | Auditors | For | Against | Auditing firm rendered inaccurate opinions |

Dimensional Fund Advisors INC

| Company Name | Class | Meeting Date | Proposal Issue | Policy | Vote | Comments |
|---|---|---|---|---|---|---|
| Ashland Inc. | Common | 01/29/04 | Directors | For | Against | The board has refused to meet with its owners. The stock price is down 50%. |

<Plan Sponsor Name> Votes Not Cast

Header: For Company = All  (Remove "Meeting Dates" field) — 800

ABC Bank Asset Manager

| Company Name | Class | Meeting Date | Shares Not Cast | % of Holdings Not Cast |
|---|---|---|---|---|
| Alliance Gaming Corporation | Common | 12/10/03 | 10,540 | 1.44% |
| Amdocs Limited | Ordinary | 01/22/03 | 56,210 | 3.12% |
| AOL Time Warner, Inc. | Common | 5/16/2003 | 16,200 | 0.95% |
| CanWest Global Communications Corp. | Multiple | 01/29/04 | 75,890 | 7.39% |
| D.R. Horton, Inc. | Common Par Value $.01 | 01/29/04 | 100,525 | 10.62% |
| Dell | Common | 4/23/2003 | 99,400 | 9.25% |
| Family Dollar Stores, Inc. | Common | 01/15/04 | 87,200 | 8.99% |
| IDT Corporation | Common | 12/15/2003 | 12,002 | 1.76% |
| Qwest Communications International, | Common | 12/16/2003 | 45,110 | 4.32% |
| The BOC Group PLC | ADR | 01/23/04 | 65,010 | 6.41% |

Dimensional Fund Advisors INC

| Company Name | Class | Meeting Date | Shares Not Cast | % of Holdings Not Cast |
|---|---|---|---|---|
| Ashland Inc. | Common | 01/29/04 | 50,690 | 5.33% |

Goldman Sachs & Co Asset Management

| Company Name | Class | Meeting Date | Shares Not Cast | % of Holdings Not Cast |
|---|---|---|---|---|
| Silicon Graphics, Inc. | Series E Preferred | 12/16/2003 | 10,392 | 0.09% |
| Amdocs Limited | Ordinary | 01/22/03 | 56,210 | 3.12% |

FIG. 8

Vote Summary

Header:

| For Company: | Tyco International, Ltd. | | Class: | Common |
|---|---|---|---|---|
| Meeting Date: | 3/6/2003 | | Ballot Shares: | 1,000,000.00 |

Manager

| Manager | | | | Ballot Shares |
|---|---|---|---|---|
| Alliance Bernstein Institutional Investment Manager* | | | | 400,000.00 |
| Dimensional Fund Advisors INC* | | | | 400,000.00 |
| Oppenhiemer Capital* | | | | 200,000.00 |
| | | | Total | 1,000,000.00 |
| | | | % of outstanding shares | 0.07% |

| Proposal Number | Proposal Issue | Management Recommendation | Net Vote | Net Shares | % of Shares |
|---|---|---|---|---|---|
| 1 | Directors* | For | For | 200,000.00 | 20% |
| 2 | Auditors* | For | For | 1,000,000.00 | 100% |
| 3 | Adopt Stock Option Plan* | For | Against | 600,000.00 | 60% |
| 4 | Environment* | For | N/A | 0.00 | 0% |

FIG. 9

Net Voting Detail

| Header: | | | | | | | |
|---|---|---|---|---|---|---|---|
| For Company: Tyco International, Ltd. | | | | | | Class: | Common |
| Meeting Date: 3/6/2003 | | | | | | Ballot Shares | 1,000,000.00 |

| Proposal Number | Proposal Issue | Mgmt Recommendation | Manager | Vote Cast | Ballot Shares | Net Vote | Net Shares |
|---|---|---|---|---|---|---|---|
| | Directors (Edward D. Breen)* | For | Alliance Bernstein Institutional Investment Manager | For | 400,000.00 | | |
| 1.1 | | | Dimensional Fund Advisors INC | Against | 400,000.00 | For | 200,000.00 |
| | | | Oppenhiemer Capital | For | 200,000.00 | | |
| | Directors (John A. Krol)* | For | Alliance Bernstein Institutional Investment Manager | For | 400,000.00 | | |
| 1.2 | | | Dimensional Fund Advisors INC | Against | 400,000.00 | For | 200,000.00 |
| | | | Oppenhiemer Capital | For | 200,000.00 | | |
| | Directors (Jerome B. York)* | For | Alliance Bernstein Institutional Investment Manager | For | 400,000.00 | | |
| 1.3 | | | Dimensional Fund Advisors INC | Against | 400,000.00 | For | 200,000.00 |
| | | | Oppenhiemer Capital | For | 200,000.00 | | |
| | Directors (Mackey J. McDonald)* | For | Alliance Bernstein Institutional Investment Manager | For | 400,000.00 | | |
| 1.4 | | | Dimensional Fund Advisors INC | Against | 400,000.00 | For | 200,000.00 |
| | | | Oppenhiemer Capital | For | 200,000.00 | | |
| | Auditors* | For | Alliance Bernstein Institutional Investment Manager | For | 400,000.00 | | |
| 2 | | | Dimensional Fund Advisors INC | For | 400,000.00 | For | 1,000,000.00 |
| | | | Oppenhiemer Capital | For | 200,000.00 | | |

FIG. 10

Detail by Manager

| Header: | | |
|---|---|---|
| For Company: | Tyco International, Ltd. | Class: Common |
| Meeting Date: | 3/6/2003 | Ballot Shares: 1,000,000.00 |

Alliance Bernstein Institutional Investment Manager

| Ballot Shares | Proposal Number | Proposal Issue | Vote |
|---|---|---|---|
| 400,000.00 | 1.1 | Directors (Edward D. Breen)* | For |
| | 1.2 | Directors (John A. Krol)* | For |
| | 1.3 | Directors (Jerome B. York)* | For |
| | 1.4 | Directors (Mackey J. McDonald)* | For |
| | 2 | Auditors* | Against |
| | 3 | Adopt Stock Option Plan* | Against |
| | 4 | Environment* | |

Dimensional Fund Advisors INC

| Ballot Shares | Proposal Number | Proposal Issue | Vote |
|---|---|---|---|
| 400,000.00 | 1.1 | Directors (Edward D. Breen)* | Against |
| | 1.2 | Directors (John A. Krol)* | Against |
| | 1.3 | Directors (Jerome B. York)* | Against |
| | 1.4 | Directors (Mackey J. McDonald)* | Against |
| | 2 | Auditors* | For |
| | 3 | Adopt Stock Option Plan* | Against |
| | 4 | Environment* | For |

FIG. 11

<Plan Sponsor Name> Detail by Issue  /1200

Issue: Elect Directors

| Company Name | Class | Meeting Date | Net Vote |
|---|---|---|---|
| Accenture Ltd. | Class A Common | 02/05/04 | For |
| Accenture Ltd. | Class X Common | 02/05/04 | For |
| Actuant Corporation | Class A Common | 1/9/2004 | For |
| Acuity Brands, Inc. | Common | 12/18/2003 | For |
| ADVO, Inc. | Common Par Value $.01 | 1/23/2004 | Withhold |
| Aetna Inc. | Common | 04/30/04 | Withhold |
| Agilent Technologies, Inc. | Common | 3/2/2004 | For |
| Air Products & Chemicals, Inc. | Common Par Value $1.00 | 1/22/2004 | For |
| Alberto-Culver Company | Class B Common | 1/22/2004 | For |
| Alliance Gaming Corporation | Common | 12/10/03 | For |
| Allied Domecq PLC | ADR | 1/30/2004 | Withhold |
| Allied Waste Industries, Inc. | Common | 12/18/2003 | For |
| Allied Waste Industries, Inc. | Series A Preferred | 12/18/2003 | For |
| Amdocs Limited | Ordinary | 01/22/03 | For |
| AOL Time Warner, Inc. | Common | 5/16/2003 | For |
| AOL Time Warner, Inc. | LMCN-V Common | 5/16/2003 | Withhold |
| Apache Corporation | Common | 12/18/2003 | For |
| Apogent Technologies, Inc. | Common | 01/27/04 | For |
| ARAMARK Corporation | Class A Common | 02/03/04 | For |
| ARAMARK Corporation | Class B Common | 02/03/04 | For |
| Arch Chemicals, Inc. | | 04/24/04 | For |
| ArvinMeritor, Inc. | Common Par Value $1.00 | 02/18/04 | For |
| ASA Limited | Ordinary | 02/06/04 | For |
| Ashland Inc. | Common | 01/29/04 | Withhold |
| Atmos Energy Corporation | Common | 02/11/04 | For |
| Avista Corporation | Common | 05/13/04 | For |

FIG. 12

Detail by Manager

Header:
For Manager: Alliance Bernstein Institutional Investment Manager — 1300

| Company Name | Meeting Date | Ballot Shares | Proposal Number | Proposal Issue | Vote |
|---|---|---|---|---|---|
| Accenture Ltd. | 02/05/04 | 500,000.00 | 1.1 | Dennis F. Hightower | For |
| | | | 1.2 | William L. Kimsev | For |
| | | | 1.3 | Robert I. Lipp | For |
| | | | 1.4 | Wulf Von Schimmelmann | For |
| | | | 2 | Auditors | For |
| | | | 3 | Other Business | Against |
| AOL Time Warner, Inc. | 5/16/2003 | 640,000.00 | 1.1 | James L. Barksdale | For |
| | | | 1.2 | Stephen F. Bollenbach | For |
| | | | 1.3 | Frank J. Caufield | Against |
| | | | 2 | Incentive Plans | For |
| | | | 3 | Cash Bonus Plan | For |
| | | | 4 | Business Principles | For |
| | | | 1.1 | Moshe Kaganoff | For |
| | | | 1.2 | James S. Gilmore, III | Against |
| | | | 1.3 | Jack F. Kemp | For |

FIG. 13

| Header: | | | | |
|---|---|---|---|---|
| For Company: | All | | | |
| For Manager: | ABC Asset Managers | | | |
| | | | | |
| Company Name | Class | Meeting Date | Shares Not Cast | % of Holdings Not Cast |
| Alliance Gaming Corporation | Common | 12/10/03 | 10,540 | 1.44% |
| Amdocs Limited | Ordinary | 01/22/03 | 56,210 | 3.12% |
| AOL Time Warner, Inc. | Common | 5/16/2003 | 16,200 | 0.95% |
| CanWest Global Communications Corp. | Multiple | 01/29/04 | 75,890 | 7.39% |
| D.R. Horton, Inc. | Common Par Value $.01 | 01/29/04 | 100,525 | 10.62% |
| Dell | Common | 4/23/2003 | 99,400 | 9.25% |
| Family Dollar Stores, Inc. | Common | 01/15/04 | 87,200 | 8.99% |
| IDT Corporation | Common | 12/15/2003 | 12,002 | 1.76% |
| Qwest Communications International, Inc. | Common | 12/16/2003 | 45,110 | 4.32% |
| The BOC Group PLC | ADR | 01/23/04 | 65,010 | 6.41% |

| Votes Against Policy | | | | | | |
|---|---|---|---|---|---|---|
| Header: | | | | | | |
| For Company: | All | | | | | |
| For Manager: | ABC Bank Asset Manager | | | | | |
| Company Name | Class | Meeting Date | Proposal Issue | Policy | Vote | Comments |
| Qwest Communications International, Inc. | Common | ######## | Environment | Abstain | For | If this company quit polluting, they'd stop having to pay major fines. |
| AOL Time Warner, Inc. | Common | 5/16/2003 | Auditors | For | Against | Auditing firm indicted. |
| AOL Time Warner, Inc. | LMCN-V Common | 5/16/2003 | Auditors | For | Against | Auditing firm indicted. |
| IDT Corporation | Class A Common | ######## | Adopt Stock Option Plan | For | Against | Plan is not performance based |
| IDT Corporation | Class B Common | ######## | Adopt Stock Option Plan | For | Against | Plan is not performance based |
| IDT Corporation | Common | ######## | Adopt Stock Option Plan | For | Against | Plan is not performance based |
| Alliance Gaming Corporation | Common | 12/10/03 | Director Compensation | For | Against | Compensation already above standard. |
| Dell | Common | 4/23/2004 | Improve Labor Practices | Abstain | Against | Company faces EEOC fine. |
| CanWest Global Communications Corp. | Multiple | 01/29/04 | Directors | For | Withhold | Same Chairman and CEO |
| CanWest Global Communications Corp. | Subordinate | 01/29/04 | Auditors | For | Against | Company hasn't changed auditors in ten years |
| Amdocs Limited | Ordinary | 01/22/03 | Auditors | For | Against | Excessive non-audit fees |
| The BOC Group PLC | ADR | 01/23/04 | Directors | For | Withhold | Poor corporate performance and excessive compensation |
| The BOC Group PLC | ADR | 01/23/04 | Approve Reincorporation | Against | For | Delaware laws more responsive |

FIG. 15

| Detail by Issue: Director | | | | | | | |
|---|---|---|---|---|---|---|---|
| Proposal Number | Proposal Issue | Mgmt Recommendation | Manager | Vote Cast | Ballot Shares | Net Vote | Net Shares |
| 1.1 | Directors (Edward D. Breen) | For | Alliance Bernstein Institutional Investment Manager | For | 400,000.00 | | |
| | | | Dimensional Fund Advisors INC | Against | 400,000.00 | For | 200,000.00 |
| | | | Oppenhiemer Capital | For | 200,000.00 | | |
| 1.2 | Directors (John A. Krol)* | For | Alliance Bernstein Institutional Investment Manager | For | 400,000.00 | | |
| | | | Dimensional Fund Advisors INC | Against | 400,000.00 | For | 200,000.00 |
| | | | Oppenhiemer Capital | For | 200,000.00 | | |
| 1.3 | Directors (Jerome B. York) | For | Alliance Bernstein Institutional Investment Manager | For | 400,000.00 | | |
| | | | Dimensional Fund Advisors INC | Against | 400,000.00 | For | 200,000.00 |
| | | | Oppenhiemer Capital | For | 200,000.00 | | |
| | | | Alliance Bernstein Institutional Investment Manager | For | 400,000.00 | | |

| Detail by Manager | | | | | |
|---|---|---|---|---|---|
| Header: | | | | | |
| For Manager: | Alliance Bernstein Institutional Investment Manager —1700 | | | | |
| | | | | | |
| Company Name | Meeting Date | Ballot Shares | Proposal Number | Proposal Issue | Vote |
| | | | 1.1 | Edward D. Breen | For |
| | | | 1.2 | John A. Krol | For |
| | | | 1.3 | Jerome B. York | For |
| Tyco International, Ltd. | 3/6/2003 | 400,000.00 | 1.4 | Mackey J. McDonald | For |
| | | | 2 | Auditors | For |
| | | | 3 | Stock Options | Against |
| | | | 4 | Environment | Against |

Detail by Issue: Director

| Proposal Number | Proposal Issue | Issue Detail |
|---|---|---|
| 1.1 | Directors (Edward D. Breen) | Mr. Breen, age 47, has been our Chairman and Chief Executive Officer since July 2002. Prior to joining Tyco, Mr. Breen was President and Chief Operating Officer of Motorola from January 2002 to July 2002; Executive Vice President and President of Motorola |

| <Plan Sponsor Name> Reports by Issue | |
|---|---|
| Management Issue: Compensation | |
| Proposal Issue | Detail by Issue |
| Add Shares to Employee Stock Purchase Plan | view |
| Add Shares to Stock Award Plan | view |
| Add Shares to Stock Option Plan | view |
| Adopt Deferred Compensation Plan | view |
| Adopt Employee Stock Purchase Plan | view |
| Adopt Stock Award Plan | view |
| Adopt Stock Option Plan | view* |
| Amend Annual Bonus Plan | view |
| Amend Deferred Compensation Plan | view |
| Amend Employee Stock Purchase Plan | view |
| Amend Executive Profit Sharing/Bonus Plan | view |
| Amend Long Term Bonus Plan | view |
| Amend Stock Award Plan | view |
| Amend Stock Option Plan | view |
| Amend Stock Option Plan | view |
| Amend Stock Purchase Plan/SAYE/AESOP | view |
| Approve Annual Bonus Plan | view |
| Approve Bonus | view |
| Approve Employment Agreements | view |
| Approve Executive Profit Sharing/Bonus Plan | view |
| Approve Long-Term Bonus Plan | view |
| Approve Option/Purchase Plan-Overseas Employees | view |
| Approve Option/Stock Awards | view |
| Approve Remuneration Policy | view |
| Approve Savings Plan | view |
| Approve Stock Option Grants | view |
| Approve Stock Option Plan | view |
| Approve Stock Option Plan for Subsidiary | view |
| Approve Stock Purchase Plan/SAYE/AESOP | view |

1900

Plan Sponsor

Report Customizer

What type of report would you like to create?

2110

| Select a Population... | Select a Report Type... |
|---|---|
| Companies | Vote Summary<br>Net Voting Detail<br>Detail by Manager |

Enter the criteria for your report. All fields are optional.

2120

| Enter Company Name: | | OR | Select from a List |
|---|---|---|---|

Enter Meeting Date: (mm/dd/yyyy)  on or after [      ] and before [      ]

-------- OR --------

Select a Period...

Most Recent 1st Quarter
Most Recent 2nd Quarter
Most Recent 3rd Quarter
Most Recent 4th Quarter
Current Year-To-Date
Last Year-To-Date
History-To-Date Meeting Type:

Select a Meeting Type...

All
Annual
Special
Consent
Contested

Sort by:

Select a Sort Type...

Company Name
Meeting Date

Sort order:  ⊙ Ascending   ○ Descending

[ Submit ]  [ Cancel ]

FIG. 21

Plan Sponsor

Report Customizer

What type of report would you like to create?

2210

| Select a Population... | | Select a Report Type... |
|---|---|---|
| Managers | | Details By Company |
| | | Votes Not Cast |
| | | Votes Against Policy |

Enter the criteria for your report. All fields are optional.

2220

| Enter Manager Name: | | OR | Select from a List |
|---|---|---|---|
| Enter Company Name: | | OR | Select from a List |

Enter Meeting Date: (mm/dd/yyyy) on or after [ ] and before [ ]

------ OR ------

| Select a Period... |
|---|
| Most Recent 1st Quarter |
| Most Recent 2nd Quarter |
| Most Recent 3rd Quarter |
| Most Recent 4th Quarter |
| Current Year-To-Date |
| Last Year-To-Date |
| History-To-Date |

Meeting Type:

| Select a Meeting Type... |
|---|
| All |
| Annual |
| Special |
| Consent |
| Contested |

Sort by (within Manager):

| Select a Sort Type... |
|---|
| Company Name |
| Meeting Date |

Sort order: ● Ascending ○ Descending

Manager Comments Display: ● Show ○ Hide

[ Submit ] [ Cancel ]

FIG. 22

Plan Sponsor

Report Customizer

What type of report would you like to create?

2310 — Select a Population... | Select a Report Type...
Issues | Management Issue
 | Shareholders Issues
 | Both Enter the criteria for your report. All fields are optional.

2320 —
- Enter Proposal Issue: [            ] OR Select from a List
- Enter Company Name: [            ] OR Select from a List
- Enter Meeting Date: (mm/dd/yyyy) on or after [    ] and before [    ]
  --------OR--------
  Select a Period...
  - Most Recent 1st Quarter
  - Most Recent 2nd Quarter
  - Most Recent 3rd Quarter
  - Most Recent 4th Quarter
  - Current Year-To-Date
  - Last Year-To-Date
  - History-To-Date
- Meeting Type: Select a Meeting Type...
  - All
  - Annual
  - Special
  - Consent
  - Contested
- Sort by (within Issue): Select a Sort Type...
  - Company Name
  - Meeting Date
- Sort order: ⦿ Ascending    ○ Descending

[ Submit ]   [ Cancel ]

FIG. 23

METHOD AND SYSTEM FOR ELECTRONIC REPORTING OF INSTITUTIONAL VOTES AFFECTING CORPORATE GOVERNANCE TO A PLAN SPONSOR

CROSS-REFERENCE TO RELATED APPLICATION

The present patent application is a formalization of a previously filed, co-pending provisional patent application entitled "Method and System for Electronic Reporting of Institutional Votes Affecting Corporate Governance to a Plan Sponsor," filed on Apr. 19, 2005 as U.S. patent application Ser. No. 60/672,901 by the inventor named in this patent application. This patent application claims the benefit of the filing date of the cited provisional patent application according to the statutes and rules governing provisional patent applications, particularly 35 USC § 119 (e)(1) and 37 CFR §§ 1.78(a)(4) and (a)(5). The specification and drawings of the provisional patent application are specifically incorporated herein by reference.

BACKGROUND OF THE INVENTION

The present invention relates generally to institutional voting on issues affecting corporate governance and, more particularly, to processes for communicating directly with large shareowners that have engaged institutions to manage and vote on corporate governance issues on their behalf.

Publicly traded corporations in the U.S. are required by law to hold one meeting per year. The annual meeting serves the purpose of acquiring shareholder and/or bondholder approval on proposals pertaining to the corporation's management and operations, or other corporate actions. Corporations may also hold other special meetings and consent solicitations whenever shareholder and/or bondholder approval is required for additional purposes, e.g., acquisitions, mergers, proxy fight, etc.

The conventional process for an annual meeting begins with the corporation or mutual fund company setting a meeting date. A special or extraordinary meeting can be mandated by the Securities and Exchange Commission (SEC) or another institution. The corporation or mutual fund company, or other interested party, submits filings to the SEC that are pertinent to the meeting. The shareholders, bondholders or other stakeholders vote their shares at the meeting. Because of the significant economic impact of the voting results, corporations or mutual funds engage special agents to facilitate the distribution of materials for the annual meeting and voting process.

SUMMARY OF THE INVENTION

The present invention is directed to a method, system and program product for the electronic reporting (delivery) of institutional votes affecting corporate governance to a Plan Sponsor. An Institutional Account Holder, also referred to as a Plan Sponsor, establishes a retirement plan for employees or other eligible participants who contribute and benefit from the plan. The Plan Sponsor engages Institutions (also referred to as managers) to establish investment options for the retirement plan and invest in securities for the participants. The Plan Sponsor engages Custodians to hold and record its positions in the various investments of the plan. As participants make contributions to the plan, the Institutions purchases shares of issuers (also referred to as companies), which are held at the bank or brokerage firm known as the Custodian.

The Institutions vote the shares they hold of a company on proposal issues that are associated with an annual meeting or special meeting of that company. The Plan Sponsor is required to monitor the proxy voting of their managers, but there is no standardization of those reports and no way to aggregate the votes of multiple managers who may hold and vote the same company on behalf of the Plan Sponsor. The invention enables the Plan Sponsor to select various reports for viewing, downloading and printing that are made available through the electronic vote reporting platform of the invention. The user interface associated with the electronic vote reporting platform enables customization of certain displays of voting results.

In one aspect of the invention, a method is provided for electronically reporting a plurality of institutional votes to an institutional account holder (i.e., plan sponsor). The institutional manger accounts forming the complete investment portfolio of a plan sponsor are determined. An electronic template is provided to each institutional manager to declare a proxy voting position on each issue that can appear on a corporate proxy ballot. An equity position in a corporation's stock as of a record date is received from a custodian bank. Subsequently, each institutional manager is presented with an electronic proxy ballot for each position in the corporation's stock. Each institutional manager is enabled to vote proxies using an electronic vote reporting platform. A plurality of voting results from the votes of the institutional managers is aggregated by the electronic vote reporting platform. An electronically-generated report for the aggregated voting results is then provided to the institutional account holder.

BRIEF DESCRIPTION OF THE DRAWINGS

The invention is better understood by reading the following detailed description of the invention in conjunction with the accompanying drawings.

FIG. 4 illustrates an exemplary display of vote results by company (i.e., issuer) associated with the Plan Sponsor.

FIG. 5 illustrates an exemplary display of vote results by manager associated with the Plan Sponsor.

FIG. 6 illustrates an exemplary display of vote results by issue associated with the Plan Sponsor.

FIG. 7 illustrates an exemplary display of votes against policy by selected companies or managers associated with the Plan Sponsor.

FIG. 8 illustrates an exemplary display of votes not cast by selected companies or managers associated with the Plan Sponsor.

FIG. 9 illustrates an exemplary display of a vote summary for a particular company held by managers associated with the Plan Sponsor.

FIG. 10 illustrates an exemplary display of net voting detail by proposal issue for a particular company/meeting.

FIG. 11 illustrates an exemplary display of net voting detail for each manager for a particular company meeting.

FIG. 12 illustrates an exemplary display of all companies for a particular issue and the net vote on the issue for each company.

FIG. 13 illustrates an exemplary display of all companies/proposal issues for a particular manager and the manager's vote on each company issue.

FIG. 14 illustrates an exemplary display of votes not cast by a particular manager for all companies for the Plan Sponsor.

FIG. 15 illustrates an exemplary display of votes against policy by each manager for the Plan Sponsor.

FIG. 16 illustrates an exemplary display of selected issue detail for the Plan Sponsor.

FIG. 17 illustrates an exemplary display of selected company detail by manager for the Plan Sponsor.

FIG. 18 illustrates an exemplary display of a selected proposal issues for a particular Plan Sponsor.

FIG. 19 illustrates an exemplary display of all proposal issues for a particular issue category for the Plan Sponsor.

FIG. 21 illustrates an exemplary user interface to customize reports for company (issuer) data.

FIG. 22 illustrates an exemplary user interface to customize reports for manager data.

FIG. 23 illustrates an exemplary user interface to customize reports for proposal issue data.

DETAILED DESCRIPTION OF THE INVENTION

Figure 1A:
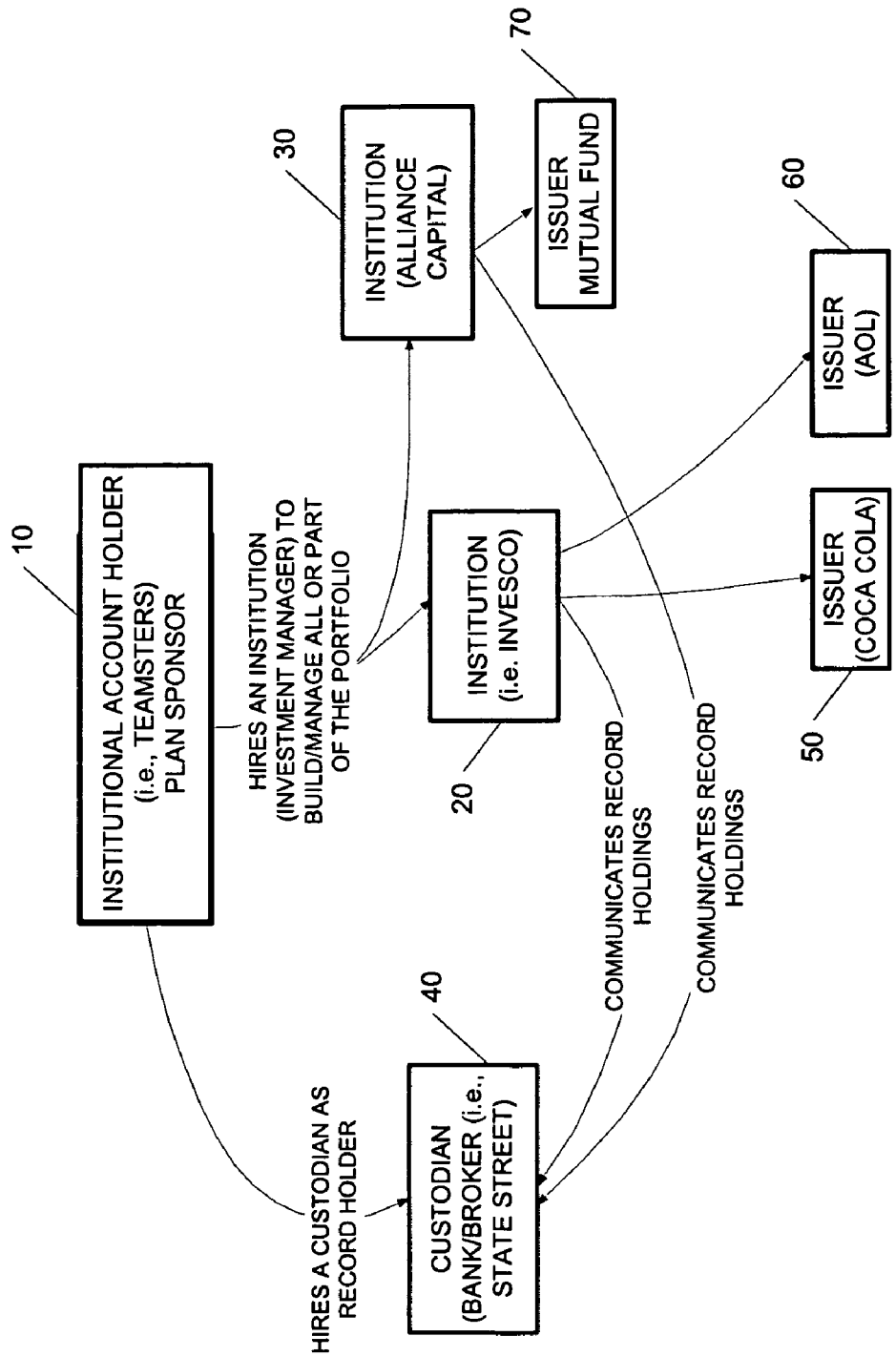
FIG. 1A illustrates a scenario of Plan Sponsor, Institution and Custodian relationships in which the present invention can be utilized.

The following description of the invention is provided as an enabling teaching of the invention in its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances and are a part of the present invention. Thus, the following description is provided as illustrative of the principles of the present invention and not in limitation thereof, since the scope of the present invention is defined by the claims.

DEFINITIONS

Account—A shareowner opens an account with a custodian (bank or broker) and either votes their positions themselves or hires an institution to vote on their behalf. The institution may use the custodian account number or create their own internal account number.

Broker—An agent who is a member of a stock exchange or an exchange member firm authorized to buy and sell securities.

Confidential Voting—Under a confidential voting policy, management does not know how shareholders vote on their proxy cards, or view ballots or voting tabulations that identify shareholders' votes. Independent tabulators and inspectors of elections are responsible for examining individual ballots, while management and shareholders are simply given vote totals. Confidential voting policies often include exceptions for certain types of contested elections.

CUSIP Number—A nine-digit identification number appearing on each security certificate that increases the efficiency of automated securities handling. The CUSIP number consists of:

Six characters identifying the issuer

Two characters identifying the specific issue

One character that allows the computer to check the accuracy of the entire number Custodian—A custodian is an organization, such as a bank, brokerage firm, or mutual fund company, that's responsible for the assets of a pension plan, 401(k) plan, mutual fund, or IRA. The custodian has no fiduciary responsibility for the way the money is invested.

Depository Trust and Clearing Corporation (DTCC)—The DTCC is the world's largest securities depository, holding trillions of dollars in assets for the members of the financial industry that own the corporation. It is also a national clearinghouse for the settlement of corporate and municipal securities transactions. The DTCC, a member of the Federal Reserve System, was created in 1999 as a holding company with two primary subsidiaries, the Depository Trust Company (DTC) and the National Securities Clearing Corporation (NSCC).

Institution—A company that is hired by a shareowner to manage their account and vote on their behalf.

Issuer—Publicly traded US corporations and mutual funds.

Legal Proxy—a power of attorney executed by a broker, nominee or individual empowering another party (usually an individual) to vote shares at a shareholder meeting.

NOBO (Non-Objecting Beneficial Owner)—A beneficial ("street") security holder who has not objected to his or her name being released to the Corporation, if the Corporation so requests.

Nominee Name—A name that is used by a Corporation and a Custodian as a generic registered owner of a stock or a bond. The use of nominee names makes the processing of securities transfers easier.

Objecting Beneficial Owner (OBO)—A beneficial owner who "objects" to his or her name being released to the Corporation, upon the Corporation's request.

Omnibus Proxy—A list issued by depositories or institutions detailing their participants, and their holdings, and authorizing the participants to vote their proxies directly. Omnibus proxies are issued by Cede & Co. and by certain bank custodians.

Plan Sponsor—A shareowner that hires an institution to manage and vote on their behalf. Plan Sponsors will periodically request reports on how the institution has voted.

Proxy Advisors—Proxy advisors offer institutions vote analysis, vote recommendation and vote execution services.

Proxy Distributor/Agent—A company that distributes proxy information to institutions and shareowners.

Quarterly Report (Form 10Q)—A report filed quarterly with the Securities and Exchange Commission (SEC) by most reporting companies. It includes un-audited financial statements and provides a continuing view of the company's financial position during the year. The filing is due 45 days after each fiscal quarter. The Annual Report usually includes fourth quarter information.

Record Holder—The individual or institution listed on the Corporation's books as a security holder.

Registered Owner—An individual or organization to whom certificates are directly issued, and is recorded on the Corporation's security holder records as maintained by the transfer agent.

Securities—A broad term referring to stocks, bonds and other investment instruments.

SEC (Securities and Exchange Commission)—The Commission established by Congress in 1933 to help protect investors, primarily through stringent and ongoing disclosure requirements placed upon issuing corporations.

Share—The partial ownership of the Corporation and/or the stock certificate evidencing that ownership.

Solicitors—Issuers hire solicitors to distribute materials, track and solicit votes, and tabulate and report voting results.

Tabulation Report—A proxy tally report detailing the current quorum and vote figures on each proposal.

Transfer Agent—An agent of the issuer responsible for transferring ownership of the Corporation's publicly traded securities, and maintaining applicable records. The transfer agent also issues and cancels certificates, and typically responds to security holder inquiries, tabulates proxy votes, and issues dividend checks.

Vote Agent—A vote agent is hired by institutions to vote their positions held in companies and mutual funds.

Voting Policy—Institutions and proxy advisors create voting policies which list how they would normally vote on proposal issues. Many institutions adopt the voting policy of a proxy advisor instead of creating their own.

FIG. 1A illustrates a scenario of Plan Sponsor, Institution, and Custodian relationships in which the present invention can be utilized. An Institutional Account Holder 10 (e.g., Teamsters) establishes a pension plan for their employees. As the plan benefactor, the Institutional Account Holder 10 is referred to as the Plan Sponsor. The employees who contribute/benefit from the plan are referred to as participants.

As a Plan Sponsor, the Institutional Account Holder 10 will hire Institutions 20, 30 to establish investment options for their plan. A Plan Sponsor 10 may hire more than one Institution 20, 30 to ensure they have a broad diversified plan for their participants. The Plan Sponsor will become an Institutional Account Holder 10 with the Institution.

The Institutional Account Holder will also hire a bank/broker, referred to as a Custodian 40, to hold/record its positions. As participants and the Plan Sponsor 10 contribute to the plan the Institutions 20, 30 will obtain holdings 50, 60, 70, also known as shares, from Issuers, such as AOL, and communicate the holdings/shares to the Custodian 40.

In a specific business scenario, the Teamsters as Plan Sponsor 10 hire State Street Bank (Custodian 40) to hold/record its pension plan holdings. The Teamsters hire Invesco (Institution 20) to manage its asset holdings, in which it chooses Coca Cola (Issuer 50) and AOL (Issuer 60), and hires Alliance Capital (Institution 30) to manage its mutual fund holdings. As the plan participants (employees) and Plan Sponsors (Teamsters) contribute to the plan, Invesco purchases holdings/shares of Coca Cola and AOL, while Alliance Capital invests in mutual finds. Both Invesco and Alliance Capital communicate on a regular basis with State Street Bank the holdings/shares owned/held by the Teamsters (Plan Sponsor).

Figure 1B:
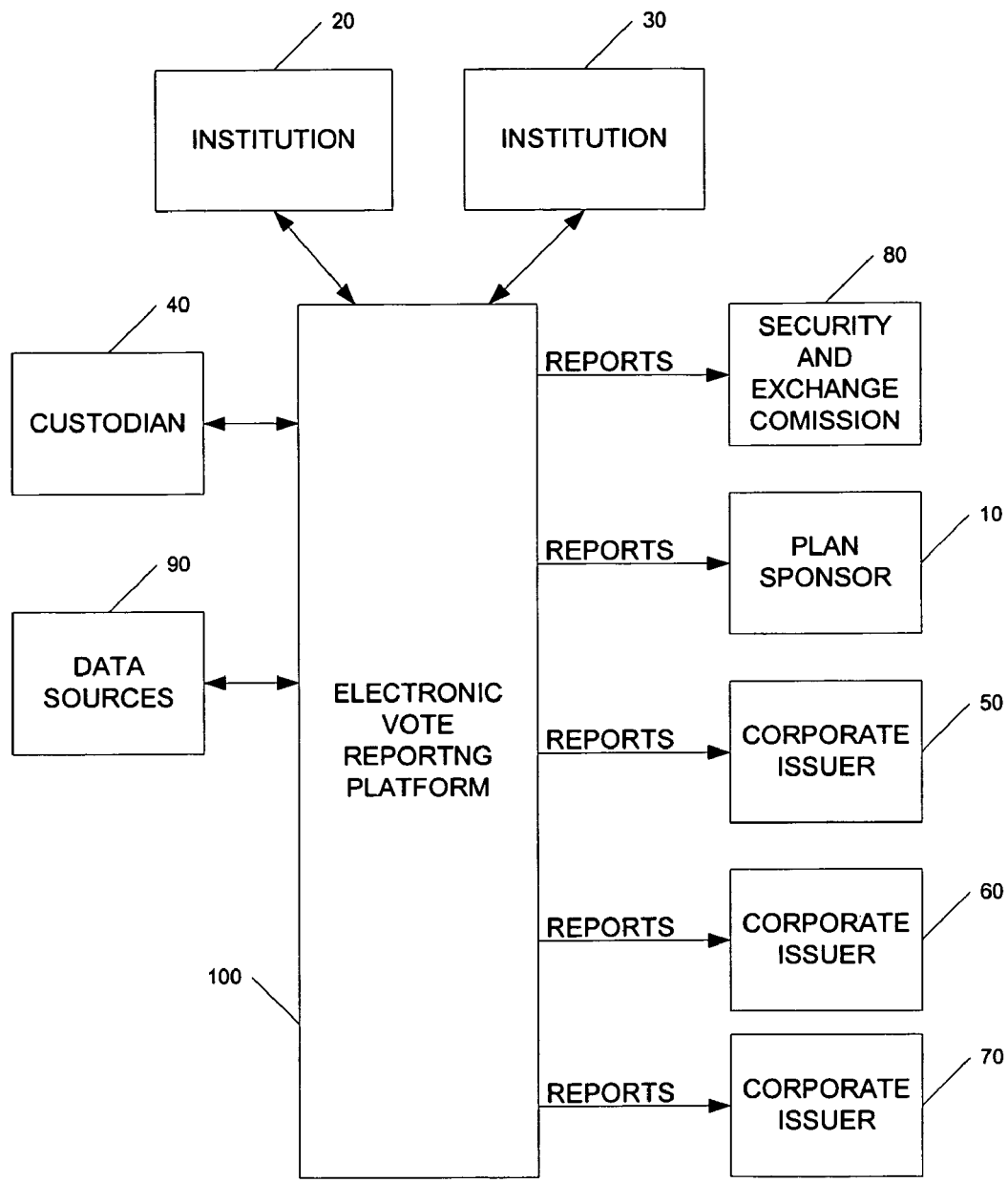
FIG. 1B illustrates an exemplary electronic vote reporting system of the invention.

FIG. 1B illustrates an exemplary electronic vote reporting system. The electronic vote reporting platform 100 is a software-implemented system that interacts with the Plan Sponsor 10, Corporate Issuers 50, 60, 70, Institutions 20, 30, Custodian(s) 40 and SEC 80, and generates the reports that are made available electronically to the Plan Sponsor at a specified date following an annual or special meeting. Also shown in FIG. 1B is data sources block 90 which collectively represents relevant data received from various sources that are pertinent to proxy voting and/or electronic vote reporting. The data includes, but is not limited to, meeting notification data, ballot information, Institution share position, Custodian share position of institutional voter, analysis information pertaining to ballot proposals, voting policy and recommendation information pertinent to ballot proposals, issuer data, securities data and solicitation messages from Issuers or shareholders.

The results of annual and special meetings that can be viewed by the Plan Sponsor 10 are those meetings that have been voted on and adjourned. Meetings that are in-progress and future meeting data are excluded from the view for Plan Sponsors.

More specifically, the invention is directed to a method for electronically reporting a plurality of institutional votes to an institutional account holder (i.e., plan sponsor). The institutional manger accounts forming the complete portfolio of a plan sponsor are determined. An electronic template is provided to each institutional manager to declare a proxy voting position on each issue that can appear on a corporate proxy ballot. An equity position in a corporation's stock as of a record date is received from a custodian bank. Subsequently, each institutional manager is presented with an electronic proxy ballot for each position in the corporation's stock. Each institutional manager is enabled to vote proxies using an electronic vote reporting platform. A plurality of voting results from the votes of the institutional managers is aggregated by the electronic vote reporting platform. An electronically-generated report for the aggregated voting results is then provided to the Plan Sponsor. A separate electronically-generated report for the voting results for each institutional manager over a selected period of time can also be provided to the institutional account holder. The electronically-generated reports can include a summary and/or detailed voting records across all managers or for each institutional manager over selected time periods.

Each management or shareholder proposal is coded on the electronic proxy ballot presented to each institutional manager. The voting results are then aggregated for each institutional manager for each proposal/issue using the proposal coding. An exception report is generated and presented to the Plan Sponsor for each stock position on which the institutional manager failed to vote. Such a failure to vote would be a violation of Department of Labor requirements.

The electronic plan sponsor vote reporting platform compares each institutional manger's actual votes with the institutional manager's declared voting policy for a specific time period. Each instance of an actual vote cast by an institutional manager that differs from the declared position is determined and displayed to the institutional account holder, along with the institutional manager's explanation, if any, for the voting discrepancy. The electronic plan sponsor vote reporting platform can also determine and display a pattern of differences for the institutional manager on a plurality or previous votes.

Figure 2:
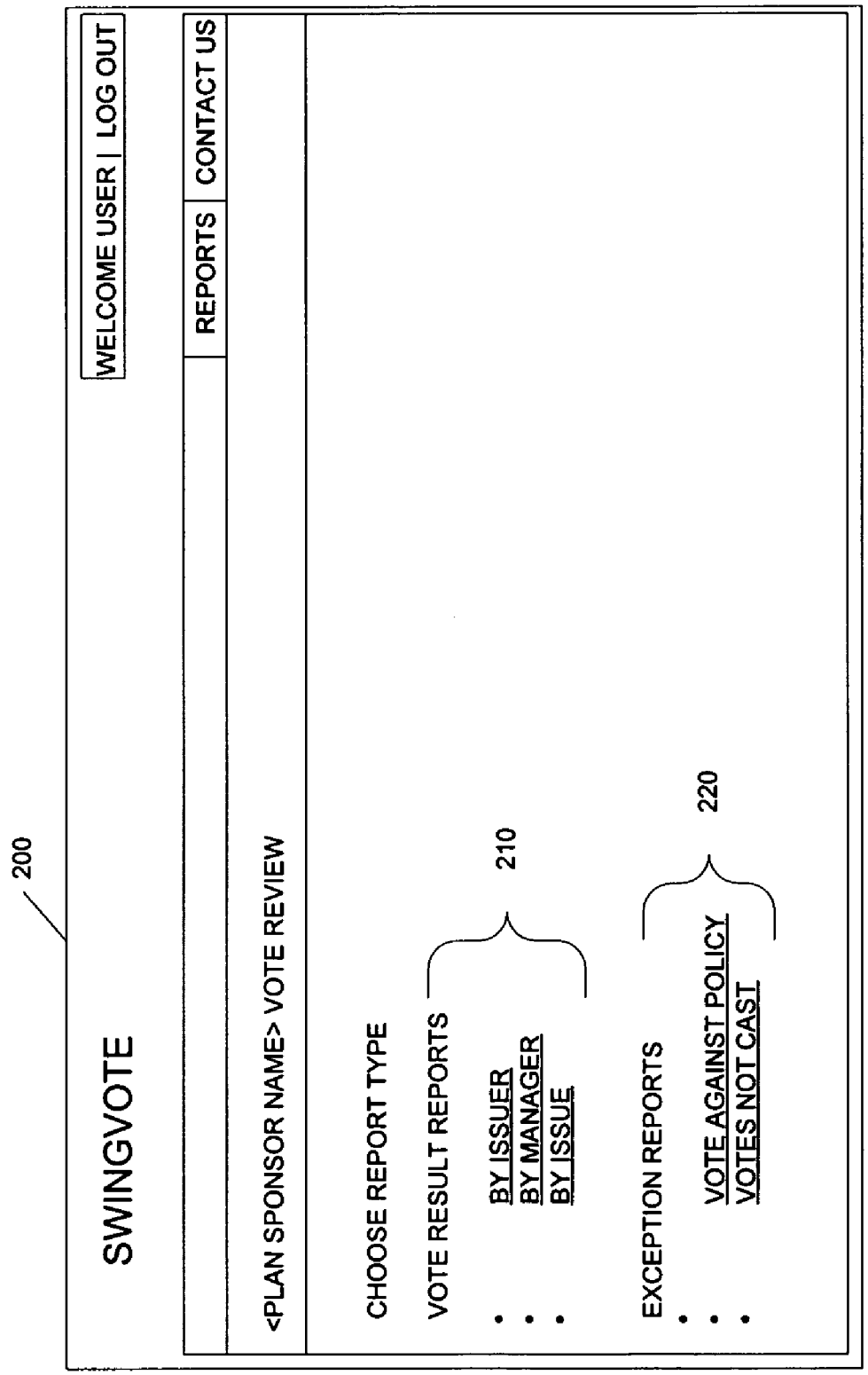
FIG. 2 illustrates the system provider main menu that is accessible by a Plan Sponsor to view meeting vote results in accordance with an exemplary embodiment of the invention.

The electronic plan sponsor reporting system provider's main menu screen 200 is depicted in FIG. 2. The Plan Sponsor can select vote result reports 210 by issuer, by manager or by issue, or can select exception reports 220 by votes against policy or votes not cast. Depending on the type of report selected by the Plan Sponsor, a series of additional screens will display the requested information in varying amounts of detail.

Figure 3:
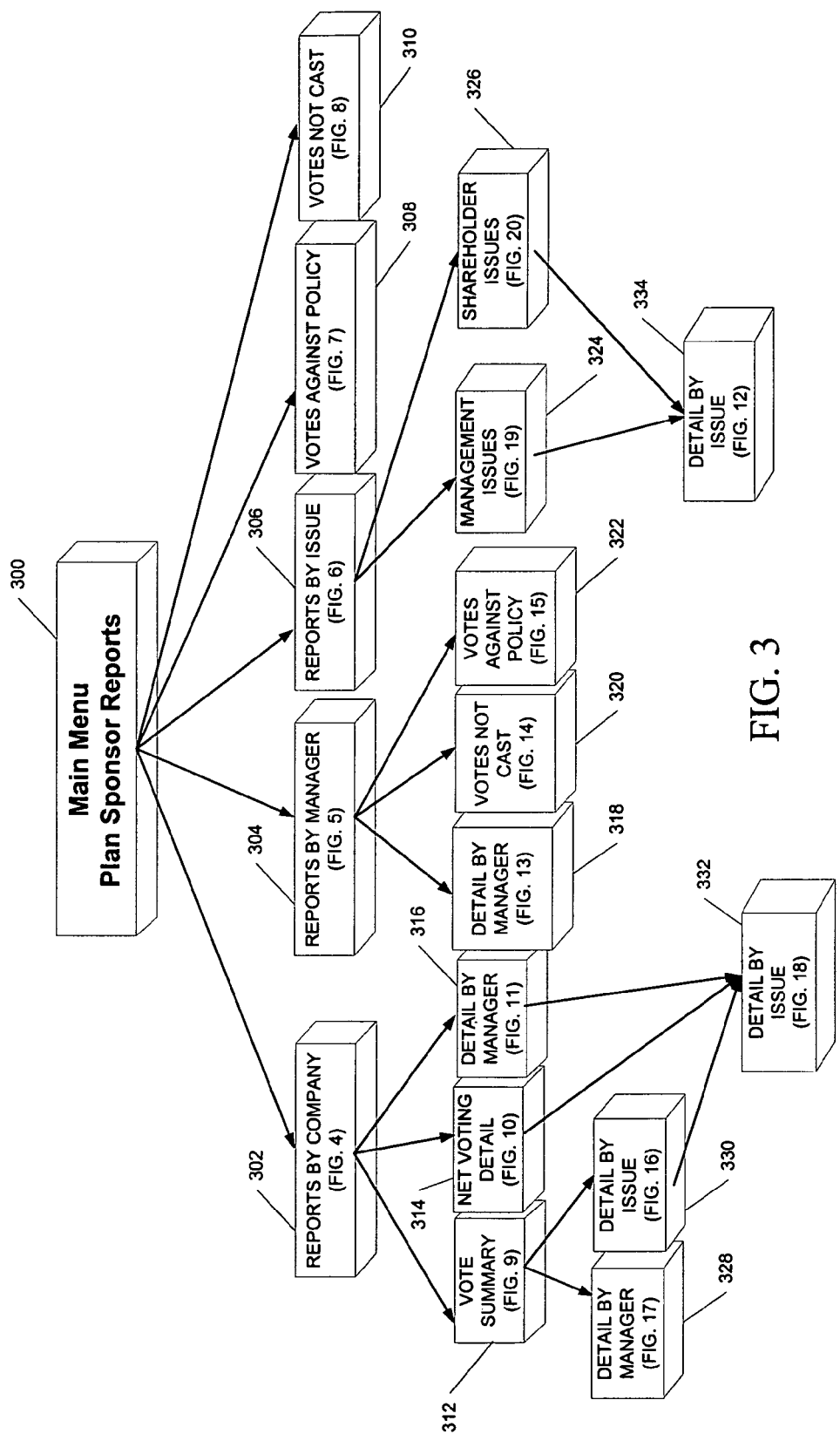
FIG. 3 illustrates a hierarchy of screen displays available to the Plan Sponsor in accordance with an exemplary embodiment of the invention.

FIG. 3 illustrates the hierarchy of screen displays based on the report initially selected on main menu 200. The hierarchy of plan sponsor screen displays 300 in FIG. 3 includes at a first level: reports by company (i.e., issuer) 302, reports by manager 304, reports by issue 306, vote against policy 308 and votes not cast 310. If reports by company 302 is selected, then the user will be able to select from a vote summary report 312, a net voting detail report 314, and a detail by manager report 318, as will be explained more fully below. If reports by manager 304 is selected, then the user can select from a detail by manager report 318, a votes not cast report 320 and a votes against policy report 322. If reports by issue 306 is selected, the user can select between management issues 324 and shareholder issues 326, and from each of these reports to a detail by issue display 334. From the vote summary screen display 312, the user can navigate to a detail by manager report 328 or a detail by issue report 330, and from report 330 to a second detail by issue report 332 as further explained below. From both the net voting detail screen display 314, and the detail by manager screen display 316, the user can navigate to a detail by issue report 334

FIG. 4 illustrates an exemplary display of voting results by company 400 for the Plan Sponsor. There are six data fields depicted in the figure. The first column identifies the companies (issuers) associated with the Plan Sponsor. The second column displays the class of issuer stock. The third column displays the adjourned meeting date for each company. The fourth through sixth columns display links (i.e., "view") for displaying a vote summary (FIG. 9), net voting detail (FIG. 10) or detail by manager (FIG. 11).

FIG. 5 illustrates an exemplary display of voting results by manager 500 for the Plan Sponsor. There are four data fields depicted in the figure. The first column displays the manager names for the Plan Sponsor. The second through fourth columns display links (i.e., "view") for displaying details by a specific company (FIG. 13) for a selected manager, a votes not cast (FIG. 14) or votes against policy (FIG. 15).

Figure 20:
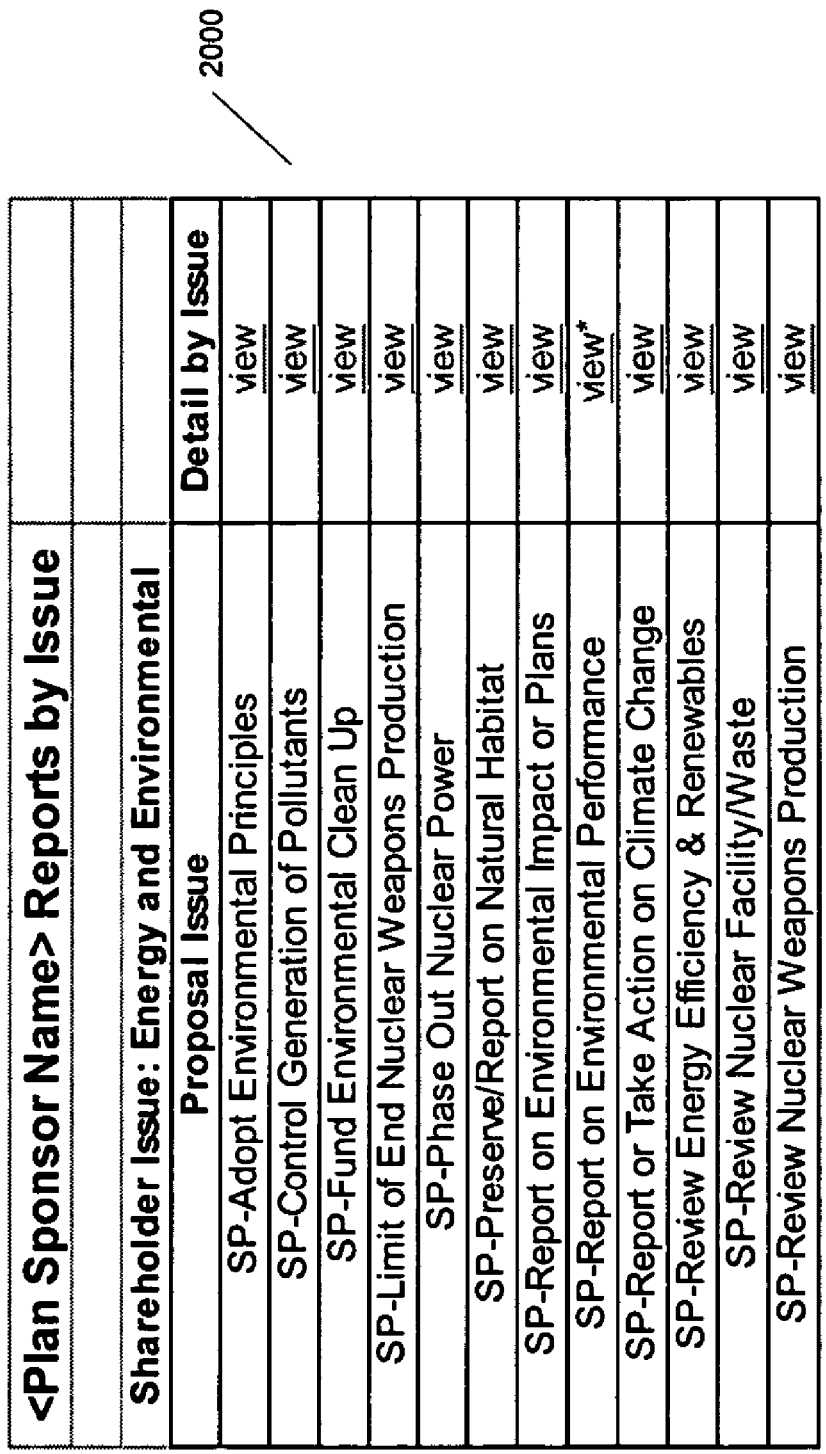
FIG. 20 illustrates an exemplary display of all shareholder proposal issues for a particular issue category for the Plan Sponsor.

FIG. 6 illustrates an exemplary display of voting results by issue 600 for the Plan Sponsor. There are three data fields depicted in the figure. The first column displays the issue categories for the Plan Sponsor. The issue categories identified are for exemplary purposes only as typical issues that are voted upon. This list is not intended as being exhaustive of all possible issues that can be acted upon during an annual or special meeting. Some issue categories apply as both management and shareholder issues; other issue categories apply as either management or shareholder issues. The second and third columns display links (i.e., "view") for displaying management proposal issues (FIG. 19) and shareholder proposal issues (FIG. 20).

FIG. 7 illustrates an exemplary display of all votes against policy 700 exception report for the Plan Sponsor. There are eight data fields depicted in the figure. The first column displays the manager name and company names associated with each manager name for the Plan Sponsor. The second column displays the class of issuer stock. The third column displays the adjourned meeting date. The fourth column displays the proposal issue being voted upon. The fifth column displays the policy vote recommendation. The sixth column displays the actual vote cast. The final column displays comments by the voter on why the voter voted against the recommended policy.

FIG. 8 illustrates an exemplary display of a votes not cast 800 exception report for the Plan Sponsor. There are six data fields depicted in the figure. The first column displays the manager name and company names associated with each manager name for the Plan Sponsor. The second column displays the class of issuer stock. The third column displays the adjourned meeting date. The fourth column displays the quantity of shares not voted. The final column displays the votes not cast as a percentage of the total number of share holdings available for voting.

FIG. 9 illustrates a voting summary 900 on proposal issues for all companies under a particular manager for the Plan Sponsor. Navigation to this screen is from the voting results by company display of FIG. 4. The voting summary is partitioned into several segments with each segment having different data fields. The top segment 910 includes the following data fields: company name, class of stock, the adjourned meeting date, and the number of ballot shares for the issuer. The second segment 920 includes the following data fields: manager names, ballot shares held by each corresponding manager, the total number of shares held by all mangers identified, and the ballot shares held for the issuer as a percentage of all outstanding shares. The lower segment 930 includes data fields for proposal number, proposal issue, management recommendation, the net vote on each proposal (for or against), the net shares between for votes and against votes expressed as a positive number, and the net shares expressed as a percentage of the total ballot shares.

FIG. 10 illustrates a voting summary 1000 for all proposal issues for a particular company and meeting date for the Plan Sponsor. Navigation to this screen is from the voting results by company display of FIG. 4. The proposal issue summary is partitioned into two segments with each segment having different data fields. The top segment 1010 includes the following data fields: company name, class of stock, the adjourned meeting date, and the number of ballot shares for the issuer. The lower segment 1020 includes data fields for proposal number, proposal issue, management recommendation, manager names, the vote cast (for, against, abstain) by the corresponding manager, the ballot shares held by each manager, the net vote cast (for, against, abstain), and the net shares again represented as the difference between the for votes and the against votes for a particular proposal issue.

FIG. 11 illustrates a net voting detail by manger display 1100 for all proposal issues for a particular company/meeting date. Navigation to this screen is from the voting results by company display of FIG. 4. The net voting detail by manager summary is partitioned into two segments with each segment having different data fields. The top segment 1110 includes the following data fields: company name, class of stock, the adjourned meeting date, and the number of ballot shares for the issuer. The lower segment 1120 identifies each manager, and for each manager provides the number of ballot shares, the proposal number, proposal issue and the vote cast by each manger (for, against, abstain) on each proposal issue.

FIG. 12 illustrates a net voting detail by issue display 1200 for all companies for a particular meeting date. Navigation to this screen is from the proposal issues by issue category display of FIG. 19 or from the shareholder proposal issues for a particular issue category display of FIG. 20. The issue is identified at the top of the display (e.g., elect directors). The different data fields represented by the columns of data include company name, class of stock, adjourned meeting ate and the net vote cast (for, against, withhold).

FIG. 13 illustrates a voting result by manager display 1300 for all companies associated with the manager and for all company issues being voted upon. Navigation to this screen is from the voting results by manager display of FIG. 5. The manager is identified at the top of the display. The data fields represented by the columns of data include company (issuer) name, the adjourned meeting date, the ballot shares, proposal numbers, proposal issues, and the vote cast by the manager for each issue for each company.

FIG. 14 illustrates a votes not cast display 1400 for all companies for a particular manager for the Plan Sponsor. Navigation to this screen is from the voting results by manager display of FIG. 5. The top segment of the display identifies the manager and the company (in this example, all companies) for which the report is generated. The columns of data include company name, class of stock, adjourned meeting date, shares not cast by the manager, and shares not cast as a percentage of all ballot shares for all managers for the Plan Sponsor.

FIG. 15 illustrates all votes against policy display 1500 for all companies for a particular manager for the Plan Sponsor. Navigation to this screen is from the voting results by manager display of FIG. 5. The top segment 1510 of the display identifies the manager and the company (in this example, all companies) for which the report is generated. The columns of data 1520 include company name, class of stock, adjourned meeting date, proposal issue for the company by class of stock, the policy recommended vote, the actual vote cast by the manager, and comments recorded by the voter for voting against the recommended policy.

FIG. 16 illustrates a selected issue detail display 1600 for the Plan Sponsor. Navigation to this screen is from the voting summary on proposal issues for all companies under a particular manager display of FIG. 9. The top of the display shows the summary issue description (e.g., Director). The different data fields represented by the columns include proposal number, proposal issue, management recommendation, manager names, vote cast by a particular manager on the corresponding issue, the total ballot shares, the net vote (for, against), and the net shares (difference between for votes and against votes).

FIG. 17 illustrates a selected company detail display 1700 for the Plan Sponsor. Navigation to this screen is from the voting summary on proposal issues for all companies under a particular manager display of FIG. 9. The top segment 1710 of the display shows the manager name. The different data fields represented by the columns 1720 include company (issuer) name, adjourned meeting date, ballot shares, proposal number, proposal issue, and the actual vote cast on the specific proposal issue.

FIG. 18 illustrates a detail on a specific proposal issues display 1800 for a particular company associated with the Plan Sponsor. Navigation to this screen is from the voting summary on proposal issues for a particular company display of FIG. 10, or from the net voting detail by manager display of FIG. 11, or from the selected issue detail display of FIG. 16. The top of the display shows the specific issue summary description. The different data fields represented by the columns include proposal number, proposal issue, and issue detail (e.g., qualifications of a particular nominee for director.

FIG. 19 illustrates a management issue display 1900 for a particular issue category for the Plan Sponsor. Navigation to this screen is from the voting results by issue display of FIG. 6. The management issue (e.g., compensation) is identified at the top of the screen. The columns of data include a listing of proposal issues (in this instance, relating to compensation) and a detail by issue link that brings up the display of FIG. 12.

FIG. 20 illustrates a shareholder issue display 2000 depicting all proposal issues for a particular issue category for the Plan Sponsor. Navigation to this screen is from the voting results by issue display of FIG. 6. The shareholder issue category (e.g., energy and environment) is identified at the top of the screen. The columns of data include a listing of proposal issues (in this instance, relating to energy and environment) and a detail by issue link that brings up the display of FIG. 12.

FIGS. 21-23 illustrate the report customizer function of the present invention. The invention enables customizing a report of companies (FIG. 21), customizing a report of managers (FIG. 22) and customizing a report of issues (FIG. 23). The top portion 2110 of FIG. 21 shows a segment of a report customizer display in which a population is selected (e.g., companies, managers, issues) and a particular report type can be selected for customization. The report types that can be customized include vote summary (FIG. 9), net voting detail (FIG. 10) and detail by manager (FIG. 11). The lower portion 2120 of FIG. 21 shows a customization by company display having data fields in which criteria for customizing the report can be entered. As illustrated in FIG. 21, the criteria include company name, meeting date or selected period, meeting type and sort criteria.

FIG. 22 illustrates report customization by managers. The top portion 2210 shows a segment of a report customizer display in which managers is selected as the population. The report types that can be customized include details by company (FIG. 13), votes not cast (FIG. 14) and votes against policy (FIG. 15). The lower portion 2220 shows a customization by manager display having data fields in which criteria for customizing the report can be entered. As illustrated in FIG. 22, the criteria include manager name, company name, meeting date or selected period, meeting type, sort criteria and manager comments display (show or hide).

FIG. 23 illustrates report customization by issue. The top portion 2310 shows a segment of a report customizer display in which issues is selected as the population. The report types that can be customized include management issues (FIG. 19), shareholder issues (FIG. 20) or both (FIG. 12). The lower portion 2320 shows a customization by manager display having data fields in which criteria for customizing the report can be entered. As illustrated in FIG. 23, the criteria include proposal issue, company name, meeting date or selected period, meeting type and sort criteria.

Figure 24:
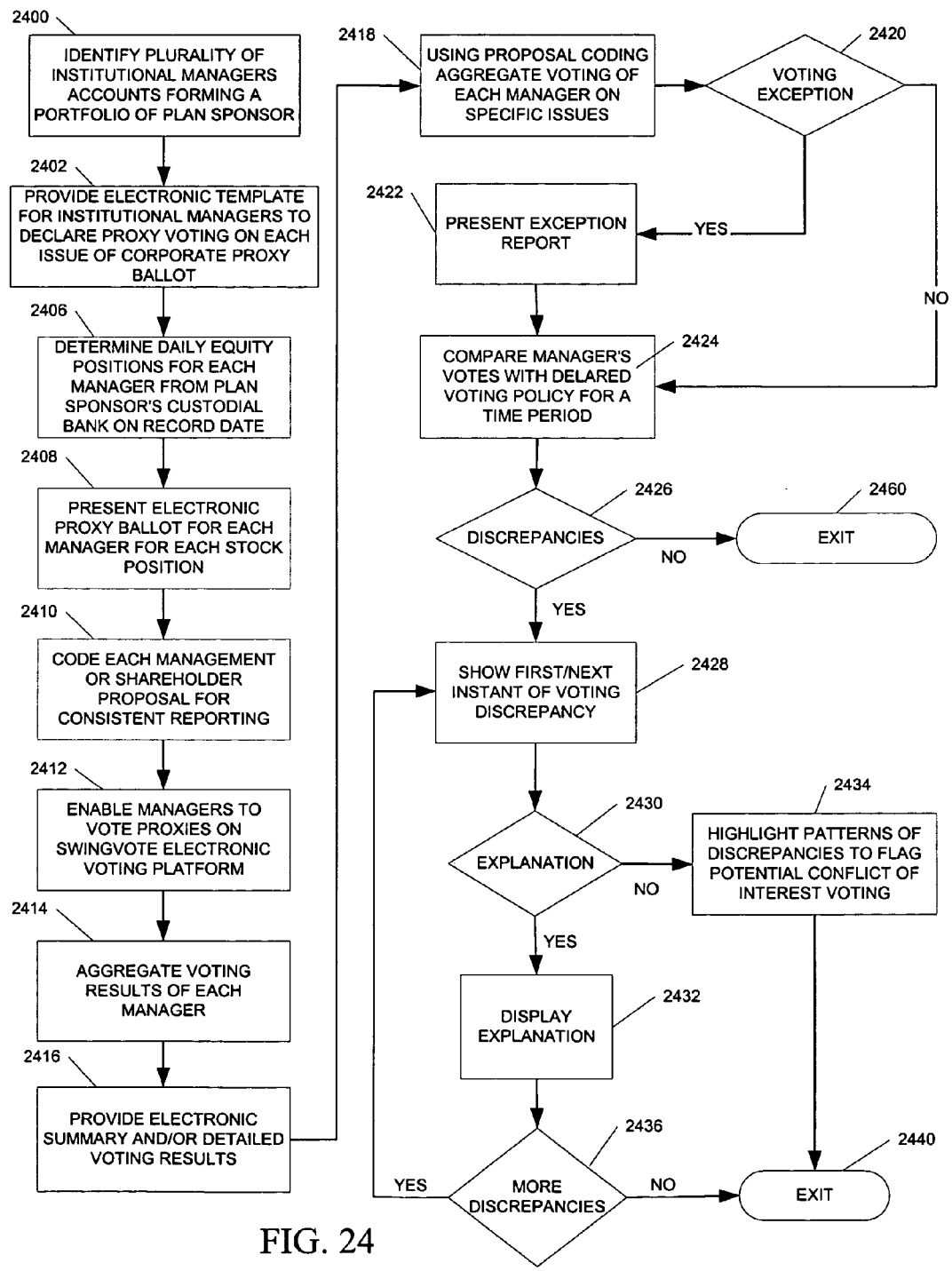
FIG. 24 illustrates processing logic for the electronic plan sponsor reporting system in accordance with an exemplary embodiment of the invention.

FIG. 24 illustrates processing logic for the electronic reporting of institutional votes in accordance with an exemplary embodiment of the invention. Processing begins, as indicated in step 2400, with determination of the institutional manger accounts forming the complete investment portfolio of a plan sponsor. An electronic template is provided to each institutional manager to declare a proxy voting position on each issue that can appear on a corporate proxy ballot, as indicated in step 2402. An equity position in a corporation's stock as of a record date is received from a custodian bank for each institutional manager as indicated in step 2406. Each institutional manager is presented with an electronic proxy ballot for each position in the corporation's stock in step 2408. Each management or shareholder proposal is coded on the electronic proxy ballot by the electronic vote reporting platform in step 2410 for subsequent aggregation for each institutional manger. Each institutional manager is enabled to vote proxies using the electronic vote reporting platform in step 2412. A plurality of voting results from the votes of all the institutional managers is aggregated by the electronic vote reporting platform in step 2414. An electronically-generated report for the aggregated voting results is then provided to the institutional account holder in step 2416. A separate electronically-generated report for the voting results for each institutional manager over a selected period of time can also be provided to the institutional account holder. The electronically-generated reports can include a summary and/or detailed voting records across all managers or for each institutional manager over selected time periods.

The voting results are then aggregated for each institutional manager for each proposal/issue using the proposal coding in step 2418. Next, a determination is made, in step 2420, as to whether or not there were any voting exceptions, i.e., a stock position on which the institutional manager did not vote. An exception report is generated and presented to the institutional account holder for each stock position on which the institutional manager failed to vote in step 2422.

The electronic plan sponsor vote reporting platform compares each institutional manager's actual votes with the institutional manager's declared voting policy for a specific time period in step 2424. Each instance of an actual vote cast by an institutional manager that differs from the declared position is determined in step 2426 and displayed to the institutional account holder in step 2428. The electronic vote reporting platform then determines if there are any explanations from the institutional manager for any voting discrepancies in step 2430. If there are explanations for the voting discrepancies, the electronic vote reporting platform displays the explanations to the institutional account holder in step 2432. The electronic vote reporting platform can also determine and display a pattern of differences for each institutional manager on a plurality or previous votes in step 2434.

The preceding process steps are implemented in software programs resident on the electronic vote reporting platform. The software programs include program instructions embedded on a computer readable medium that, when executed on the electronic vote reporting platform, perform the steps of the process.

The plan sponsor electronic vote reporting system and method of the present invention has been described as a computer implemented process. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the preferred embodiment of the present invention are possible without departing from the spirit and scope of the present invention. In addition, it is possible to use some of the features of the present invention without the corresponding use of other features. Accordingly, the foregoing description of the preferred embodiment is provided for the purpose of illustrating the principles of the present invention and not in limitation thereof, since the scope of the present invention is defined solely by the appended claims.

What is claimed is:

1. A method for electronically reporting a plurality of institutional votes to an institutional account holder, comprising the steps of:
   identifying a plurality of institutional manager accounts forming a portfolio of a plan sponsor;
   providing an electronic template requiring each of a plurality of institutional managers to declare a proxy voting position on each issue that can appear on a corporate proxy ballot;
   determining an equity position in a corporation's stock for each institutional manager from a custodian bank on a record date;
   presenting an electronic proxy ballot for each institutional manager for each position in the stock;
   enabling each institutional manager to vote proxies using an electronic vote reporting platform;
   aggregating a plurality of voting results from the votes of the plurality of institutional managers; and
   providing an electronically-generated report for the aggregated voting results to the institutional account holder.

2. The method for electronically reporting a plurality of institutional votes of claim 1 further comprising the steps of:
   coding each management or shareholder proposal on the electronic proxy ballot;
   aggregating a plurality of voting results for each institutional manager for each management or shareholder proposal based on the coding for each proposal.

3. The method for electronically reporting a plurality of institutional votes of claim 1 further comprising presenting an exception report for each stock position on which an institutional manager did not vote.

4. The method for electronically reporting a plurality of institutional votes of claim 1 further comprising comparing each institutional manager's actual votes with the institutional manager's declared proxy voting position.

5. The method for electronically reporting a plurality of institutional votes of claim 4 further comprising determining and displaying each instance of an actual vote that differs from each institutional manager's declared proxy voting position and the institutional manager's explanation for the difference between the declared proxy voting position and the actual vote.

6. The method for electronically reporting a plurality of institutional votes of claim 4 further comprising determining and displaying each instance of an actual vote that differs from each institutional manager's declared proxy voting position and a pattern of differences for the institutional manager on a plurality of previous votes.

7. The method for electronically reporting a plurality of institutional votes of claim 1 further comprising providing an electronically-generated report for the voting results for each institutional manager over a selected time period to the institutional account holder.

8. A system for electronically reporting a plurality of institutional votes to an institutional account holder, comprising:
   an electronic vote reporting platform including a plurality of modules for: (i) providing an electronic template requiring each of a plurality of institutional managers to declare a proxy voting position on each issue that can appear on a corporate proxy ballot; (ii) presenting an electronic proxy ballot for each institutional manager for each position in the stock; (iii) aggregating a plurality of voting results from the votes of the plurality of institutional managers; and (iv) providing an electronically-generated report for the aggregated voting results to the institutional account holder;
   a user interface to the electronic vote reporting platform that enables each institutional manager to vote proxies; and
   a database for storing a plurality of voting results from the votes of the plurality of institutional managers.

9. The system for electronically reporting a plurality of institutional votes of claim 8 wherein the electronic vote reporting platform further comprises a module for coding each management or shareholder proposal on the electronic proxy ballot.

10. The system for electronically reporting a plurality of institutional votes of claim 9 wherein the electronic vote reporting platform further comprises a module for aggregating a plurality of voting results for each institutional manager for each management or shareholder proposal based on the coding for each proposal.

11. The system for electronically reporting a plurality of institutional votes of claim 8 wherein the electronic vote reporting platform further comprises a module for presenting an exception report for each stock position on which an institutional manager did not vote.

12. The system for electronically reporting a plurality of institutional votes of claim 8 wherein the electronic vote reporting platform further comprises a module for comparing each institutional manager's actual votes with the institutional manager's declared proxy voting position.

13. The system for electronically reporting a plurality of institutional votes of claim 8 wherein the electronic vote reporting platform further comprises a module for determining and displaying each instance of an actual vote that differs from each institutional manager's declared proxy voting position and the institutional manager's explanation for the difference between the declared proxy voting position and the actual vote.

14. The system for electronically reporting a plurality of institutional votes of claim 8 wherein the electronic vote reporting platform further comprises a module for determining and displaying each instance of an actual vote that differs from each institutional manager's declared proxy voting position and a pattern of differences for the institutional manager on a plurality of previous votes.

15. The system for electronically reporting a plurality of institutional votes of claim 8 wherein the electronic vote reporting platform further comprises a module for providing an electronically-generated report for the voting results for each institutional manager over a selected time period to the institutional account holder.

16. A computer program product for electronically reporting a plurality of institutional votes to an institutional account holder, comprising a computer readable medium having computer readable code embedded therein, the computer readable medium comprising:
    program instructions that identify a plurality of institutional manager accounts forming a portfolio of a plan sponsor;
    program instructions that provide an electronic template requiring each of a plurality of institutional managers to declare a proxy voting position on each issue that can appear on a corporate proxy ballot;
    program instructions that receive an equity position in a corporation's stock for each institutional manager from a custodian bank on a record date;
    program instructions that present an electronic proxy ballot for each institutional manager for each position in the stock;
    program instructions that enable each institutional manager to vote proxies using an electronic vote reporting platform;
    program instructions that aggregate a plurality of voting results from the votes of the plurality of institutional managers; and
    program instructions that provide an electronically-generated report for the aggregated voting results to the institutional account holder.

17. The computer program product for electronically reporting a plurality of institutional votes of claim 16 further comprising:
    program instructions that code each management or shareholder proposal on the electronic proxy ballot;
    program instructions that aggregate a plurality of voting results for each institutional manager for each management or shareholder proposal based on the coding for each proposal.

18. The computer program product for electronically reporting a plurality of institutional votes of claim 16 further comprising program instructions that present an exception report for each stock position on which an institutional manager did not vote.

19. The computer program product for electronically reporting a plurality of institutional votes of claim 16 further comprising program instructions that compare each institutional manager's actual votes with the institutional manager's declared proxy voting position.

20. The computer program product for electronically reporting a plurality of institutional votes of claim 19 further comprising program instructions that determine and display each instance of an actual vote that differs from each institutional manager's declared proxy voting position and the institutional manager's explanation for the difference between the declared proxy voting position and the actual vote.

21. The computer program product for electronically reporting a plurality of institutional votes of claim 19 further comprising program instructions that determine and display each instance of an actual vote that differs from each institutional manager's declared proxy voting position and a pattern of differences for the institutional manager on a plurality of previous votes.

22. The computer program product for electronically reporting a plurality of institutional votes of claim 16 further comprising program instructions that provide an electronically-generated report for the voting results for each institutional manager over a selected time period to the institutional account holder.

* * * * *